Patented May 23, 1944

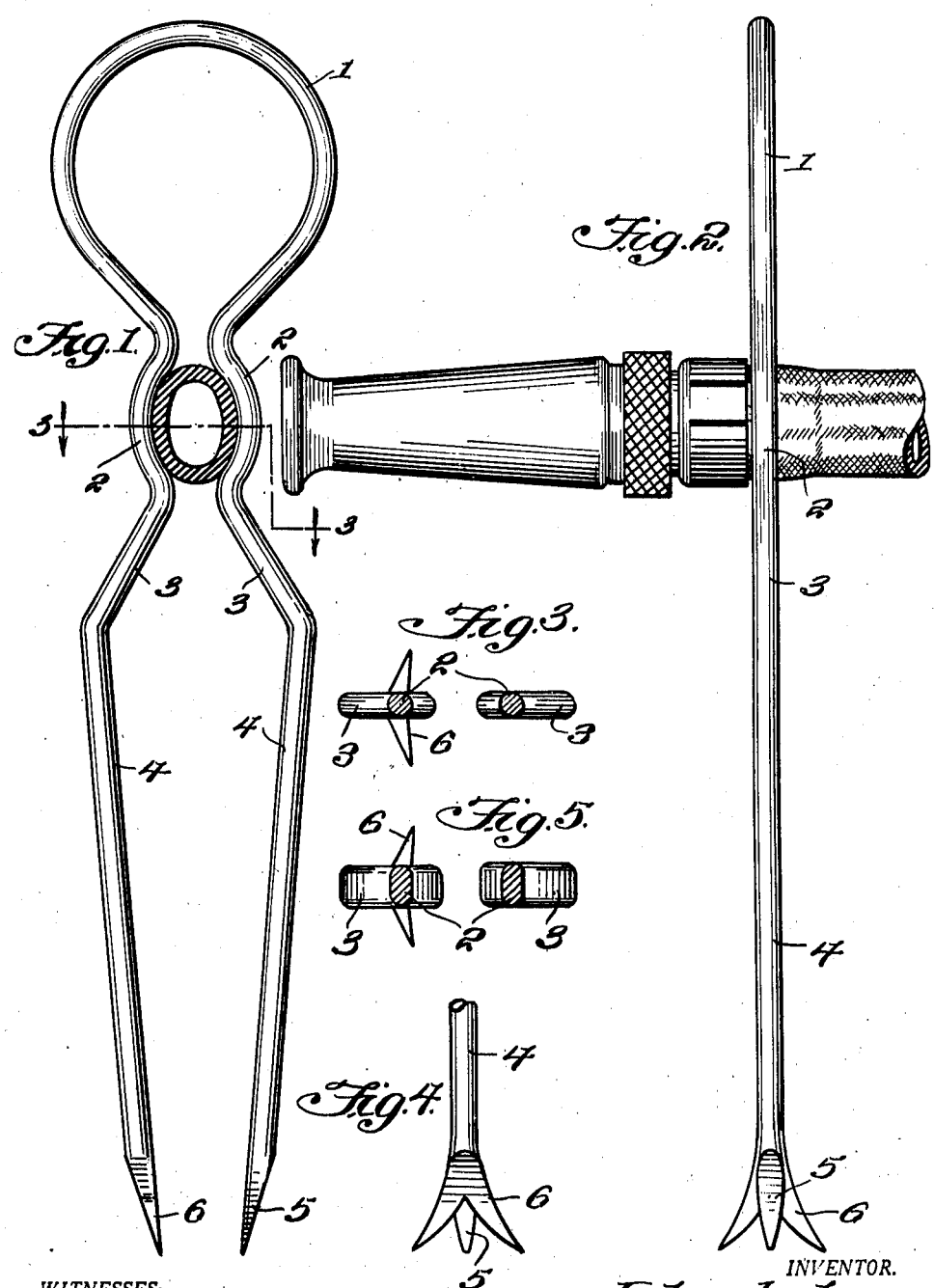

2,349,505

UNITED STATES PATENT OFFICE 2,349,505

GARDEN HOSE HOLDER

John Lohne, Denver, Colo.

Application March 30, 1943, Serial No. 481,127

3 Claims. (Cl. 248—85)

This invention relates to garden hose holders, and its general object is to provide a holder that is preferably formed from a single length of resilient material, such as rod-like wire, to include ground penetrating means and clamping jaws, the latter being adapted to grip the hose or the nozzle thereof, for holding the same in any desired position against casual removal or displacement, and the device also includes a handle to facilitate inserting and withdrawing the penetrating means with respect to the ground and for carrying the device with the hose attached thereto.

A further object is to provide a garden hose holder that is simple in construction, inexpensive to manufacture and extremely efficient in use and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a rear view of my device, with the hose clamped therein, the hose being in section.

Figure 2 is a side view, with the hose clamped adjacent to the nozzle coupling.

Figure 3 is a sectional view taken approximately on line 3—3 of Figure 1, looking in the direction of the arrows.

Figure 4 is a fragmentary view illustrating the toothed lower ends of the penetrating prongs.

Figure 5 is a sectional view similar to Figure 3, of a slightly modified form of my device.

Referring to the drawing in detail, it will be noted that my device is shown as being formed of a single length or strand of resilient rod-like wire that is of circular cross sectional shape, in the form of Figures 1 to 4, and substantially flat oval cross sectional shape in the form of Figure 5. However, the device may be formed from any suitable resilient material of any suitable cross sectional shape.

In any event, the wire in the forms shown is looped midway its ends to provide a substantially circular handle 1 at the upper end of the device, and the handle includes inclined converging lower portions merging into rounded oppositely disposed portions 2 that provide a pair of companion clamping jaws for receiving between the same a hose or the nozzle thereof, to set up a gripping engagement therewith, as indicated in Figures 1 and 2.

Formed on and depending from the lower ends of the clamping jaws are outwardly inclined relatively short intermediate diverging portions 3 that merge at their lower ends into relatively long depending prongs 4, the latter being inclined toward each other for disposal in converging relation from the portions 3 and one of the prongs terminates at its lower end into a single elongated substantially V-shaped tooth 5, while the other prong is formed with a flattened bifurcated lower end providing a pair of outwardly flared teeth 6 which can be advantageously used for removing weeds or the like from the lawn. However, the primary purpose of the teeth 5 and 6 is to bring about easy and expeditious insertion of the prongs into the ground, for supporting the device in an upright vertical or inclined position, as will be apparent.

From the above description and disclosure in the drawing it is believed that the manner of using my device will be obvious, but it might be mentioned that the hose or the nozzle thereof is first inserted between the jaws, the latter being normally held in contact with each other by the spring action of the loop or handle 1, thence the prongs are inserted in the ground and finally the hose is adjusted for directing the water, as desired. It will be further obvious that, due to the spring action of the handle, coupled with the converging relation of the prongs which tend to move the jaws toward each other when the prongs are inserted in the ground, that casual removal or displacement of the hose is practically impossible. The handle not only materially facilitates inserting and withdrawing the prongs with respect to the ground, but provides convenient means for carrying the device with the hose attached thereto, when changing the hose to different places relative to the lawn.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. A garden hose holder comprising a pair of companion jaws for receiving a hose between the same to set up a clamping engagement therewith, a substantially circular spring handle formed on and rising from the jaws for urging the latter together, intermediate members formed on and depending in diverging relation from the jaws, prongs formed on and depending from the intermediate members in converging relation, and ground penetrating teeth formed on the lower ends of the prongs.

2. A garden hose holder formed from a single strand of resilient rod-like wire looped midway its ends to provide a substantially semicircular handle including converging lower portions, oppositely disposed outwardly rounded jaws formed on the lower ends of said lower portions for receiving a hose between the same to set up a clamping engagement therewith, outwardly inclined members formed on and depending from the lower ends of the jaws in diverging relation, relatively long prongs formed on and depending from the lower ends of the outwardly inclined portions in converging relation, a ground penetrating tooth formed on the lower end of one of said prongs, and the other prong having a bifurcated lower end formed to provide a pair of outwardly flared ground penetrating teeth.

3. A hose holding device comprising a resilient rod looped medially of its ends, a pair of converging portions extending inwardly of said loop, a pair of complementary arcuate clamp portions formed adjacent said converging portions in spaced-apart hose engaging relation, a pair of relatively long prongs extending from the clamp portions in co-planar relation with the clamp and loop portions, and ground penetrating teeth formed on the outer ends of said prongs.

JOHN LOHNE.